UNITED STATES PATENT OFFICE.

ARON ECKMANN, OF BERNE, SWITZERLAND, ASSIGNOR TO SCHWEIZ. SERUM- UND IMPFINSTITUT, OF BERNE, SWITZERLAND, A CORPORATION OF SWITZERLAND.

PROCESS OF LIBERATING A GASEOUS DISINFECTANT.

1,279,524.     Specification of Letters Patent.     Patented Sept. 24, 1918.

No Drawing.     Application filed July 14, 1915. Serial No. 39,860.

*To all whom it may concern:*

Be it known that I, ARON ECKMANN, a subject of the Czar of Russia, and residing at Berne, Switzerland, have invented a certain new and useful Improved Process of Liberating a Gaseous Disinfectant, of which the following is a specification.

My invention relates to an improved process of disinfecting rooms and the like, use being made of certain exothermic processes which take place with a neutral reaction. The improved process is fundamentally different from those in which heat is produced by the neutralization of alkaline or acid substances or during the formation of alkaline or acid solutions.

The invention may be carried into practice by bringing an anhydrous sulfate of copper, for example, into contact with water and using the heat thereby released for decomposing another exorthermic compound. The still larger quantity of heat which is then liberated brings about the evaporation of a formalin solution.

Potassium chlorate may be used as such a compound which is decomposed under the action of the heat produced by anhydrous sulfate of copper and water. The decomposition of said compound by heat, with or without the action of catalyzators, such as manganese dioxid, is well known. The dissociation takes place exothermically, oxygen being liberated. Anhydrous sulfate of copper is mixed with potassium chlorate and manganese dioxid in the presence of water and formalin. In order to counteract the oxidizing action which reduces the yield of formaldehyde gas, metallic iron is added to the mixture of sulfate of copper, potassium chlorate and manganese dioxid. Evaporation begins after about 5 minutes.

Example.

The following mixture is put into a wooden vat of about 20–25 liter contents:—

300 gr. finely pulverized potassium chlorate.

500 gr. commercial pulverized iron and 300 gr. anhydrous sulfate of copper.

It is not absolutely necessary to employ manganese dioxid. These substances are weighed individually and do not require to be ground up together. This weighed mixture then has added to it the requisite quantity of formalin, 1 liter (a formaldehyde solution of about 40%), and water, 1 liter. Evaporation then begins and after about 5 minutes it takes place at its maximum speed. The formalin and water may be mixed together before use if desired.

The quantities stated in the above example suffice for the disinfection of a room of about fifty cubic centimeters. One can, of course, use also solid polymerized formaldehyde in the proportion of about 300 grams to ½ liter of water for the disinfection of a room of the same size.

I claim:—

1. A process of liberating formaldehyde which consists in mixing a mixture of a salt which generates heat in the presence of water, potassium chlorate and finely divided metallic iron with an aqueous formalin solution.

2. A process of liberating formaldehyde which consists in mixing a mixture of a salt which generates heat in the presence of water, potassium chlorate manganese dioxid and finely divided metallic iron with an aqueous formalin solution.

3. A process of liberating formaldehyde which consists in adding a mixture of anhydrous sulfate of copper, potassium chlorate and finely divided metallic iron to an aqueous formalin solution.

In testimony whereof, I affix my signature.

ARON ECKMANN.